UNITED STATES PATENT OFFICE.

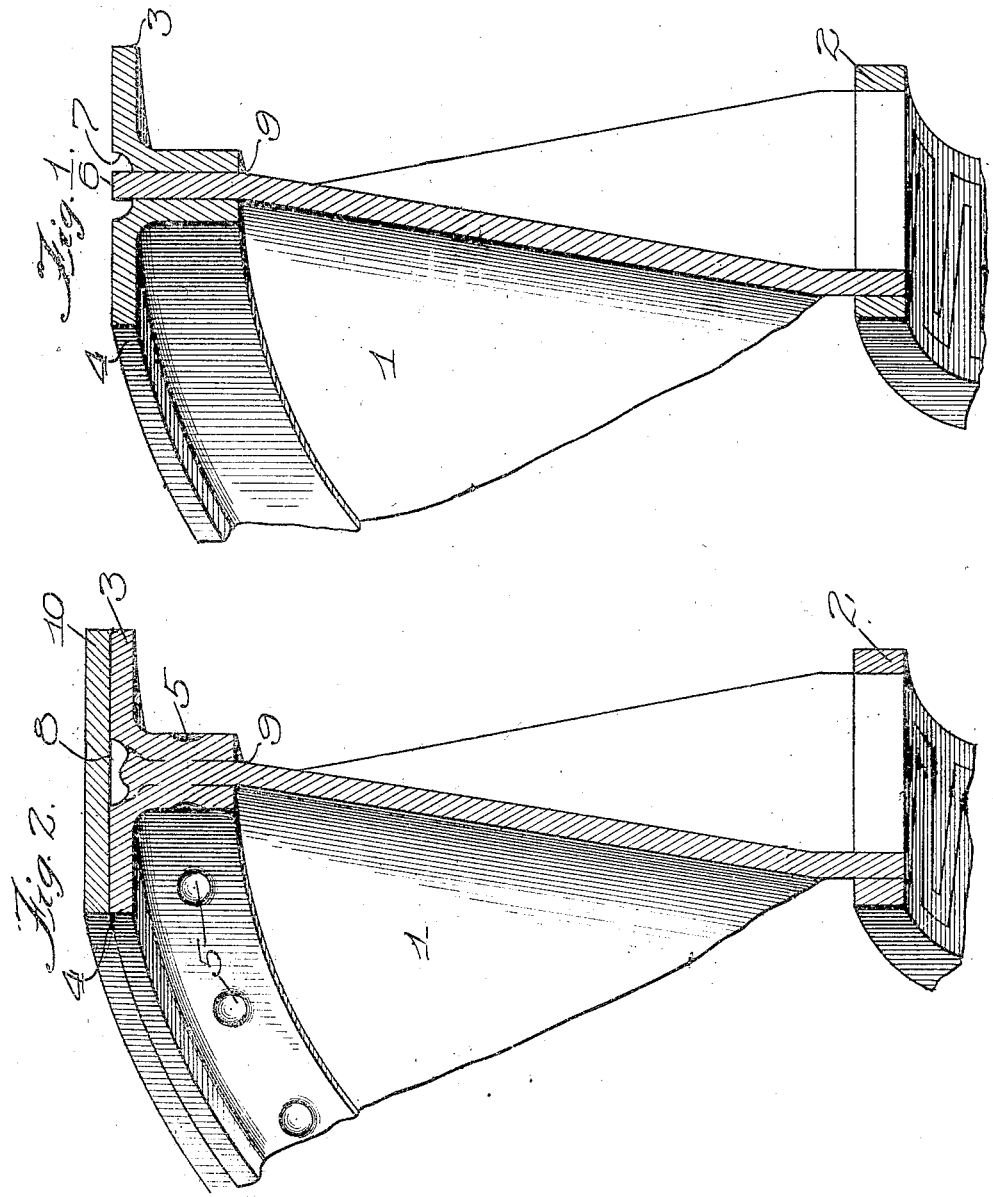

WILLIAM ERASTUS WILLIAMS, OF CHICAGO, ILLINOIS.

STEEL WHEEL.

1,131,882.     Specification of Letters Patent.     Patented Mar. 16, 1915.

Application filed May 22, 1912. Serial No. 698,930.

*To all whom it may concern:*

Be it known that I, WILLIAM ERASTUS WILLIAMS, a citizen of the United States, residing at Chicago, in the county of Cook and State of Illinois, have invented a new and useful Improvement in Steel Wheels, of which the following is a specification.

This invention relates to metal wheels and especially to wheels having a sheet steel body, center, or web, provided with a metal felly, usually encircled by a suitable tire or rim.

In the accompanying drawings, Figure 1 shows in radial section assembled unconnected wheel members. Fig. 2 shows the same members united as in the complete wheel.

In said figures, 1 represents a sheet steel body web preferably having outwardly tapering corrugations radiating from a hub 2, and 3, 4 are duplicate angle iron rings placed, in registry, against opposite faces, respectively, of the plane outer marginal portion of the web and each cut away adjacent to the web so that the peripheral portion, 6, of the latter has an annular groove 7 alongside each of its faces, so that the web might be considered as projecting into the middle of a broad peripheral felly groove. The rings when assembled with the web are united thereto by spot welding at 5, the union being at some distance from the inner margins of the ring flanges so that the web metal is not affected by heat, nor joined to the rings with absolute rigidity at 9, where strains and vibrations tend to be focused. The rings and wheel center web being firmly held together, the projecting portion of the web and the bottom of the groove are fused or welded together, usually by an electric current or an oxy-acetylene flame, the projecting portion of the web fusing down and spreading out in the groove so as to form on each face of the web an annular peripheral mass which lies at some distance within the outer cylindrical general surface of the felly made up of the two rings. Obviously, the welding extends inward to some distance from the bottom of the groove in its initial condition, and upon this zone of union is superposed the mass of metal originally projecting within the groove but now integrally connected with the rings, on each side, to a considerable distance from the web's plane. All this mass, left rough or not, lies clearly within the felly's outer surface and all of it adds strength to the wheel. A rim or tire 10, of any suitable cross section but shown as a simple metal band, is usually added in the ordinary way. Were the rings non-grooved, or of ordinary form, the welding would necessarily be done by fusing the outer ring surface metal and the intervening margin of the web, and the depth of welding would almost necessarily be slight since greater depth could be obtained only by heat long applied or of great intensity, either tending to injure the surface metal. And practically, the surface metal could not be left smooth but portions would project, so that the felly must be turned or ground to remove them, thus weakening the wheel in any case, and often additionally leaving very slight depth of welded metal, from which no flux could carry oxids as in hammer welding. Grooved rings avoid all these evils, the weld below the bottom of the groove being at least as strong as the only weld of the other construction and the mass in the groove itself forming a far stronger connection; and, withal, there is no reason for incurring the danger of injury to the metal in seeking deep welding.

What I claim is:

1. In a wheel of the class described, the combination with a metal wheel web having on each side of its marginal portion an annular laterally projecting mass of two equal annular felly members located on opposite sides of said portion and each peripherally grooved on the side next said web to receive the corresponding projecting mass, said portions lying wholly within the general peripheral surface of the two felly members and being rigidly secured to the latter.

2. In a metal wheel, the combination with a sheet steel web, of two equal and registering felly rings fitting against opposite sides of the peripheral portion of said web and each cut away to form a groove adjacent to the latter, and a metal tire encircling and covering said rings; said web being provided with an annular projecting portion extending into the corresponding groove, on each side, and integrally united, in the groove, to the metal of the rings.

3. In a wheel of the class described, the combination with a sheet steel center or web, of two registering felly rings located upon opposite sides of the marginal portion of said web and each provided with an annular groove adjacent to the latter, the marginal portion of the web extending into both grooves, within the general peripheral surface of the rings, and rigidly connected to both rings throughout the entire circle of the grooves.

4. A metal wheel comprising a central web, and two equal, annular registering felly rings lying on opposite faces of the web and each cut away to form adjacent to the web a peripheral groove, the entire marginal portion of the web being T-like in radial section, wholly within the general peripheral surface of the rings and having its body and laterally projecting masses integrally united with said rings around the entire circumference.

In witness whereof I have hereunto signed my name at the city of Chicago, Ill., on this 29th day of August, 1911, in the presence of two subscribing witnesses.

WILLIAM ERASTUS WILLIAMS.

Witnesses:
 WINFIELD S. WILLIAMS,
 F. C. MILLER.